(12) United States Patent
Bethke (10) Patent No.: US 7,141,173 B2
(45) Date of Patent: Nov. 28, 2006

(54) IN SITU TREATMENT PROCESS TO REMOVE METAL CONTAMINATION FROM GROUNDWATER

(76) Inventor: Craig M. Bethke, 607 W. Michigan, Urbana, IL (US) 61801

(*) Notice: Subject to any disclaimer, the term of this patent is extended or adjusted under 35 U.S.C. 154(b) by 158 days.

(21) Appl. No.: 10/777,390

(22) Filed: Feb. 12, 2004

(65) Prior Publication Data

US 2006/0186053 A1  Aug. 24, 2006

Related U.S. Application Data

(63) Continuation-in-part of application No. 10/741,728, filed on Dec. 19, 2003, now abandoned.

(51) Int. Cl.
*B01D 15/00* (2006.01)

(52) U.S. Cl. ............... 210/660; 210/668; 210/679; 210/749; 210/170; 210/667; 210/669; 210/670; 210/672; 210/673; 210/675; 210/688

(58) Field of Classification Search ............... 210/660, 210/668, 679, 749, 170, 667, 669, 670, 672–673, 210/675, 688
See application file for complete search history.

(56) References Cited

U.S. PATENT DOCUMENTS

| | | | |
|---|---|---|---|
| 2,355,808 A | 8/1944 | Lawlor | |
| 3,575,854 A | 4/1971 | Richards | |
| 3,579,443 A | 5/1971 | Horst | |
| 3,725,266 A | 4/1973 | Haviland | |
| 3,778,368 A | 12/1973 | Nakamura et al. | |
| 4,336,142 A | 6/1982 | Bye | |
| 4,340,253 A * | 7/1982 | Breland et al. | ................ 299/5 |
| 4,354,942 A | 10/1982 | Kaczur et al. | |
| 4,418,961 A | 12/1983 | Strom et al. | |
| 4,637,465 A * | 1/1987 | Gash | ................ 166/261 |
| 5,008,019 A * | 4/1991 | Trost | ................ 210/747 |
| 5,275,739 A | 1/1994 | Grant et al. | |
| 5,324,433 A | 6/1994 | Grant et al. | |
| 5,326,439 A | 7/1994 | Brewster | |
| 5,348,662 A | 9/1994 | Yen et al. | |
| 5,370,827 A | 12/1994 | Grant et al. | |
| 6,143,195 A * | 11/2000 | Price | ................ 252/186.1 |
| 6,398,960 B1 | 6/2002 | Borden et al. | |
| 2004/0245185 A1* | 12/2004 | Chowdhury et al. | ........ 210/749 |

OTHER PUBLICATIONS

Amy C. Berger, et al., "A Process Model of Natural Attenuation in Drainage From a Historic Mining District," *Applied Geochemistry*, 15:566-666 (2000).

* cited by examiner

*Primary Examiner*—Chester T. Barry
(74) *Attorney, Agent, or Firm*—Welsh & Katz, Ltd.

(57) ABSTRACT

The present invention provides a process for enhancing the metal contaminant sorption capacity of mineral compounds within a groundwater-bearing formation by manipulating the pH and the surface acidity of the mineral compounds. The process is useful in removing metal contaminants from groundwater within a groundwater-bearing formation, providing a backstop treatment for groundwater after previous water treatment, and for protection of water sources, for example well-head protection.

21 Claims, 2 Drawing Sheets

IN SITU TREATMENT PROCESS TO REMOVE METAL CONTAMINATION FROM GROUNDWATER

CROSS-REFERENCE TO RELATED APPLICATION

This is a continuation-in-part of application Ser. No. 10/741,728, filed Dec. 19, 2003, now abandoned, whose disclosures are incorporated herein by reference.

BACKGROUND OF THE INVENTION

Groundwater is an important water source. In consideration of the purity of the water, there are thresholds of acceptable tolerance for various metal ions. Amounts of metal ions dissolved in water that are above desirable or acceptable limits can be considered contamination. Heavy metal ions are particularly undesirable contaminants in many cases. The present invention provides methods for creating an unsatisfied demand for metal sorption in water-bearing formations in such a way as to effectively remove metal contaminants from groundwater passing through the water-bearing formation.

A water-bearing formation, in many cases referred to as an aquifer, typically is composed of areas through which groundwater flows rapidly, as well as bypassed areas through which water passes more slowly. Water-bearing formations (aquifers) are commonly bounded by relatively impermeable formations, referred to as aquitards. Metal contamination typically enters an aquifer and flows through the most conductive portions, bypassing less conductive areas and aquitards. Metal ions commonly diffuse into the bypassed areas and aquitards, and may sorb there. In any attempt to flush metal contamination from an aquifer, metal is gradually released into the main groundwater flow from bypassed areas and adjoining aquitards. Clean water passing through such a water-bearing formation can become contaminated in this way over an indefinite period. The resulting concentration of contaminants in the water-bearing formation may be small, but nonetheless significant relative to health standards.

There are several sources of heavy metal contamination. These include, but are not limited to, drainage from mining districts, electrical and electronics manufacturing processes, munitions production and weapons laboratories, metal plating processes, battery recycling, coal combustion and fly ash disposal, petroleum refining, chemical production and storage and the nuclear industry. The metal-bearing fluids that carry contamination into a water-bearing formation are commonly acidic.

It has been reported that in the United States, acidic mine drainage affects more than 19,000 kilometers of rivers and streams. Some scientists rate toxic mine drainage as the greatest water-quality problem facing the western United States. It is said that in Colorado alone, the effluent from more than 7,000 abandoned mines contaminates more than 2,500 km of streams. A significant, but unknown, amount of acidic drainage has infiltrated the subsurface, acidying drinking water aquifers there, and contaminating them with metals.

Known methods for remediation of water contaminated with metals include active remediation methods, direct precipitation methods, reactive barriers, and monitored natural attenuation methods.

Active remediation methods for groundwater treatment involve pumping out contaminated water from an aquifer and treatment of the contaminated water to remove the metal contaminants (for example through precipitation processes, sorbent processes, or electrochemical processes). The treated water is, in some cases, returned to the aquifer where it is drawn back toward the water production well. Such pumping facilities require a long-term commitment and the facilities and processes tend to be expensive. A further problem is the disposal of the metal contaminant that had been removed, because the treatment process typically generates large quantities of metal-contaminated waste.

One of the difficulties encountered in the art with active remediation methods of metal attenuation is that the methods do not effectively address the problem of gradual metal release from the water-bearing formation itself. For example, metal contaminants may diffuse from bypassed low conductivity sediment lenses into high conductivity areas.

Water treated by active remediation is, in some cases, pumped back into the aquifer prior to pumping for use. If the problem of metal release from the water-bearing formation itself is not addressed, then metals may diffuse into the previously-treated water, and may be thus rendered again unsuitable for immediate use without further treatment.

Another persistent problem with active remediation is that the difficulty in removing a certain amount of metal contaminant increases significantly with the decrease in metal ion concentration. As a result, it is significantly more costly, in time and money, to treat a large volume of slightly contaminated water than it is to treat a small volume of highly contaminated water.

Direct precipitation methods for groundwater treatment involve precipitation of the metal contaminants within the water source (e.g. aquifer) to keep the metals out of the moving groundwater. Such methods in many cases involve converting the metals to sulfide or other insoluble forms, and both biotic and abiotic approaches have been utilized. Biotic approaches use de-toxifying microorganisms to convert the metals to insoluble granules; such approaches may involve introducing sulfur compounds and stimulating sulfate-reducing bacteria. Abiotic approaches use solution methods to provide ligands and reaction conditions suitable for forming insoluble precipitates. A drawback of this type of approach is that they are able to precipitate only the metal ions present in the aquifer at the time of treatment. An additional difficulty of this method is that the precipitated metals are subject to re-dissolution (for example, by oxidation of sulfide granules), allowing metal ions to once again contaminate water in the aquifer.

Reactive barriers are constructed within a trench dug across an aquifer. The barriers, through which groundwater is allowed to pass, are designed to create a zone of chemical or biological reaction where metal contaminants are immobilized. Drawbacks to reactive barriers include the expense of constructing them, the difficulty in applying them to areas where the contamination is widespread or not limited to shallow depth, the possibility that water flow will bypass them, the possibility that metal concentrations will not be reduced to acceptable levels, and uncertain long-term performance.

Monitored Natural Attenuation methods for groundwater treatment use the naturally-present composition, structure, and microbial content of the aquifer and sediments to immobilize undesirable compounds, such as metal ions.

Such methods may be employed following periods of active remediation. Such methods have the potential, where successful, to significantly reduce costs. Such methods for processing groundwater sources run into administrative barriers such as extensive environmental monitoring required for process approval, coupled with a long and expensive application approval process in the United States. In the U.S., there is also political opposition, and the long-term effectiveness of the methods is uncertain.

In natural attenuation methods, the removal of metal contaminants may be dependent upon the sorption capacity of the ground structures that the ground water moves through. When groundwater is infiltrated with acidic fluids, the water-bearing formation becomes acidified, markedly decreasing the effectiveness of natural attenuation methods. The groundwater itself is commonly unable to rapidly affect the pH of the acidified regions in the ground, where metal sorption to the sediments is hindered. Most groundwaters have insufficient alkalinity to rapidly neutralize the sediment surfaces. As a result, the surface acidity remains high during remediation, thus decreasing the effectiveness of the formation in attenuating metal ion concentration. Furthermore, the high surface acidity may permit previously sorbed metals to desorb and reenter the groundwater flow.

Source control refers to processes for control of contaminants from a wastewater source. For example, such treatments may involve precipitation of heavy metals using alkali, and may further include addition of a precipitation agent such as silica, see, e.g. U.S. Pat. Nos. 5,370,827 and 3,579,443. Such treatments do not occur in a groundwater-bearing formation, but are carried out externally, above the land surface.

Flushing techniques are known in the art for flushing undesirable metals from out of land formations that are responsible for contaminating groundwater. U.S. Pat. No. 5,324,433 and concurrent U.S. Pat. No. 5,275,739, describe in situ methods of removing and stabilizing soluble heavy metal contaminants in soil and groundwater. They disclose an ion displacement method of introducing an aqueous remediation solution into a land formation to solubilize, mobilize and remove heavy metal ions from the soil, counteracting the retention of the ions by the charged clays, displacing the heavy metal or radioactive ions with harmless, naturally-occurring ions. The disclosed remediation solution contains at least one remediation ion selected from the group consisting of aluminum, magnesium, calcium, potassium, sodium, hydrogen, chloride, sulfate, carbonate, bicarbonate, hydroxide, or any mixture thereof. After the land formation was sufficiently flushed with remediation solution to decrease effluent undesirable metal ion content, the land formation was treated with a stabilization solution consisting essentially of sodium silicate, potassium silicate, or a mixture thereof to co-precipitate remaining metal contaminants and inhibit their remobilization.

The disclosures of any citations in this description are incorporated herein by reference.

In summary, there are no existing methods for treating a water-bearing formation to improve or regain its ability to sorb metals. There are no methods that effectively address the problem of metals diffusing out of bypassed regions into the main flow of a water-bearing formation. There is a need for an alternative or addition to existing groundwater treatment processes for attenuating the metal contaminant content. There is a great demand for such a process that does not require costly sorbent resins or off-site treatment. There is need for improvement in natural attenuation methods of groundwater treatment.

BRIEF SUMMARY OF THE INVENTION

The present invention provides a process for enhancing or regaining the metal contaminant sorption capacity of mineral compounds within a groundwater-bearing formation by manipulating the pH and the surface acidity of the mineral compounds. The process may be useful (i) for providing a groundwater-bearing formation capable of more effectively attenuating the metal content of groundwater currently within the formation as well as groundwater that passes through the formation in the future, (ii) for providing a backstop treatment for groundwater after previous water treatment, and (iii) for protection of water sources, for example well-head protection.

In a contemplated process, a water-bearing formation is exposed to an alkaline flush solution. With this process, metals sorb in place in the water-bearing formation instead of contaminating the groundwater. The alkaline flush causes mobile metals to sorb or precipitate, strengthens metal sorption and works against desorption. Most importantly, the alkaline flush creates the unsatisfied demand for metal sorption that will continue to remove metal contaminants from groundwater passing through the formation.

A preferred process for the attenuation of the metal content of groundwater from a groundwater-bearing formation is disclosed herein. A groundwater-bearing formation is typically composed of at least one mineral compound, and often several. Of course, all mineral compounds don't sorb metals to a significant extent. For purposes of discussing the present invention, a contemplated groundwater-bearing formation has at least one sorbent mineral compound that is capable of sorbing metals. This required mineral compound is referred to in the claims as "a mineral compound" for ease of reference. It is to be understood that the use of "a" in the claims is open to having more than one, but at least one, unless more is specifically recited.

A groundwater-bearing formation is provided that is made up of groundwater and a mineral compound. The mineral compound has a mineral surface with sorbing sites. The groundwater may contain mobile metal contaminants, the immobilization of which is desired. In this preferred process, some or effectively all of the mobile metal contaminants are removed from the groundwater through the following sorption process. An aqueous alkaline solution is applied to the groundwater-bearing formation to neutralize groundwater acidity and the surface acidity of the mineral compound. Decreasing the surface acidity of the mineral compound has the effect of enhancing the ability of the sorbing sites provided by the mineral compound to sorb metal ions. In preferred processes, the mineral compounds include ferric oxide, manganese oxide, alumina or silica; each of these compounds may also be composed of hydroxide and/or water, as well minor amounts of various chemical constituents. The equilibrium of the sorbing sites on the surface of the compound is shifted by raising the surface pH in such as way as to enhance sorption strength and capacity for metal ion contaminants. The mineral compound in the groundwater-bearing formation that has been in contact with the alkaline solution is referred to hereinbelow as a "treated mineral compound". When the metal-contaminated groundwater contacts the treated mineral compound, the sorbing sites sorb the mobile metal contaminants. A treated mineral compound has an increased sorption capacity as a result of the treatment. As a result, the groundwater in the treated water-bearing formation has an attenuated metal content as compared to the groundwater in the water-bearing formation prior to treatment.

In an embodiment of the preferred process, the application of the aqueous alkaline solution is accomplished through injection of the aqueous alkaline solution into the groundwater-bearing formation.

In an embodiment of the preferred process, the aqueous alkaline solution includes one or more of hydroxide, carbonate, phosphate, phosphite, or silicate, preferably hydroxide, carbonate or silicate. The cationic composition of the aqueous alkaline solution is discussed in the detailed description. The type of mineral(s) in the water-bearing formation affects the preference of aqueous alkaline solution, as discussed in more detail below.

In an embodiment of the preferred process, the mineral compounds included in the groundwater-bearing formation is one or more of ferric oxide, alumina, silica, or manganese (III) oxide, which provide sorbing sites, including their hydrous and anhydrous oxide and hydroxide forms.

A contemplated process creates an unsatisfied demand for metal sorption. In addition, in some embodiments of the preferred process, the application of aqueous alkaline solution to groundwater-bearing formation inhibits desorption of metal contaminants from the mineral compounds in the groundwater-bearing formation. In some embodiments, leaching of metals from the low-conductivity lenses to form new mobile metal contaminant is inhibited.

The present invention has many benefits and advantages, several of which are listed below.

One benefit of the invention is that the process can be carried out in the aquifer and does not require removal of the aquifer sediment.

One advantage of the invention is that the process also prevents desorbing of metals from aquifer sediment into the groundwater.

Another benefit of the process is that it does not add harmful chemicals to the environment.

An advantage of an embodiment of the invention is that it is useful for treating a groundwater-bearing formation whose metal sorption capacity has been diminished by acidic water drainage (for example, from mines) that has contaminated subsurface water.

A benefit of an embodiment of the invention is that it is useful as a backstop treatment for water effluent from a contaminant plume after primary treatment, such as a permeable reactive barrier or source control.

An advantage of an embodiment of the invention is that it can provide protection from a contaminant plume for well water supply.

BRIEF DESCRIPTION OF THE DRAWINGS

In the drawings forming a portion of this disclosure.

DETAILED DESCRIPTION OF THE INVENTION

The present invention provides a process for enhancing the capacity of mineral compounds within a groundwater-bearing formation to sorb metal contaminants. The parameters of the contemplated processes are discussed in more detail below. The processes center upon manipulation of the pH in the aqueous local environments in a groundwater-bearing formation and the surface acidity of the mineral compounds. The processes have useful applications in groundwater purification, such as in providing a groundwater-bearing formation that has enhanced sorption capacity and is therefore effective in attenuating the metal content of groundwater, providing a backstop treatment for groundwater after previous water treatment, and for the protection of water sources, for example well-head protection.

For groundwater treatment processes of attenuating metal contaminant content, the present inventor recognized that the surface acidity of the mineral compounds in the groundwater-bearing formation plays an important role. The infiltration of acidic fluids into groundwater-bearing formations increases the surface acidity of the mineral compounds, and this decreases the effectiveness of natural attenuation methods and can even exacerbate heavy metal ion contamination.

Certain negative effects, such as acidic runoff, decrease the local pH of the mineral compounds responsible for providing natural sorption sites within the groundwater-bearing formation. Under acidic conditions, the sorption affinity of the surface sites for contaminant metal ions is decreased considerably. The surface acidity of the mineral compounds also creates a pH-buffered region that serves to maintain acidic conditions in the subsurface.

These negative effects are not countered naturally. Most groundwaters lack sufficient neutralizing capacity to neutralize surface acidity in a reasonable time period for remediation. As a result, the mineral surface acidity remains high during remediation, thus decreasing the effectiveness of attenuating metal ion content.

Another negative effect of high surface acidity is that the acidic conditions permit previously sorbed metals to desorb and diffuse into the groundwater flow. The high acidity also encourages mobilization of metal ions from low conductivity lenses within the groundwater-bearing formation into the main groundwater flow.

The processes of the invention provide a means for enhancing the metal contaminant sorption capacity of groundwater-bearing formations through manipulation of the pH using aqueous alkaline solutions. The goal is to immobilize metal contaminants from the groundwater solution. This is in contrast to U.S. Pat. No. 5,324,433, where the goal was to mobilize and thus remove metal contaminants from land formations.

The processes of the invention are particularly useful for remediation of an acid-contaminated groundwater-bearing formation. An aqueous alkaline solution is introduced into an acid-contaminated groundwater-bearing formation to neutralize the acidity, and convert the mineral compounds within the groundwater-bearing formation back to a chemical form that has the desired sorption capacity for the mineral compounds. Although the net effect of a process of the invention is a process for attenuating the metal content of groundwater, a contemplated process is in many cases a remediation process for the groundwater-bearing formation itself, restoring the innate ability of the mineral compounds therein to sorb metal contaminants from the groundwater.

The introduction of an aqueous alkaline solution into a groundwater-bearing formation results in the entrainment of the aqueous alkaline solution into the groundwater flow, which is naturally often quite slow. The entrainment typically results in dilution of the introduced aqueous alkaline solution into the groundwater. The mineral compounds in the groundwater-bearing formation are treated at the solution front of the aqueous alkaline formation, consuming units of basicity while neutralizing acidity within an acid-contamination groundwater-bearing formation. Groundwater flowing behind the alkaline front enjoys the benefit of the higher sorption capacity of the treated metal compounds within the formation.

In some cases, it may be advantageous, when introducing aqueous alkaline solution into a groundwater-bearing formation, to also remove water from the formation. Such removal can make introduction of the aqueous alkaline solution more efficient and/or faster. Preferably, the water is removed down-gradient (relative to groundwater flow) of the point(s) of introduction of the alkaline solution.

A process of the present invention is exemplified by the following embodiment. An aqueous alkaline solution is pumped into an aquifer and begins to migrate along the direction of flow (i.e. toward a production well). The transit time for the injected solution is likely weeks, months, or years, due to the slow speed that groundwater typically migrates through a groundwater-bearing formation. As the solution migrates through the aquifer, its alkalinity reacts with sediments, leaving the water more acidic and the sediment surfaces neutralized.

The reaction occurs along a "front" that migrates in the direction of groundwater flow, but at a rate slower than the flow rate of the groundwater, because the alkalinity is stripped from the moving front as it passes through the groundwater-bearing formation. Upstream of the alkaline front, the solution is alkaline; downstream, its alkalinity has been consumed.

If one were to consider the process in terms of pore volumes of alkaline solution required, the number of pore volumes required depends on the number of moles of alkalinity that the specific aquifer consumes as it is neutralized, and the moles of alkalinity contained in each pore volume of alkaline solution applied (concentration-dependent). The optimal treatment conditions will vary from one groundwater-bearing formation to another. Preferably, a sufficient quantity of alkaline solution of sufficient strength is injected to drive the reaction front through the affected zone of the aquifer (i.e. the contaminated area or the zone to act as a backstop).

Groundwater-bearing formations. Contemplated groundwater-bearing formations have mineral compounds that provide metal contaminant sorbing sites. Such formations include aquifers, which include water-bearing sediment and water-bearing rock. Water-bearing rocks and other groundwater-bearing formations include sandstone, which is commonly made up of silica-based mineral compounds. Contemplated groundwater-bearing formations can include, inter alia, sediment, soil, and rock.

Groundwater-bearing formations also include those formations from which groundwater can be obtained, although the formation may arguably not rise to the level of being called an "aquifer". The term "aquifer" has a functional definition involving the ability to obtain "useful quantities" of water. Such a limitation does not apply to the contemplated groundwater-bearing formations of the present inventive process.

Figure 1:
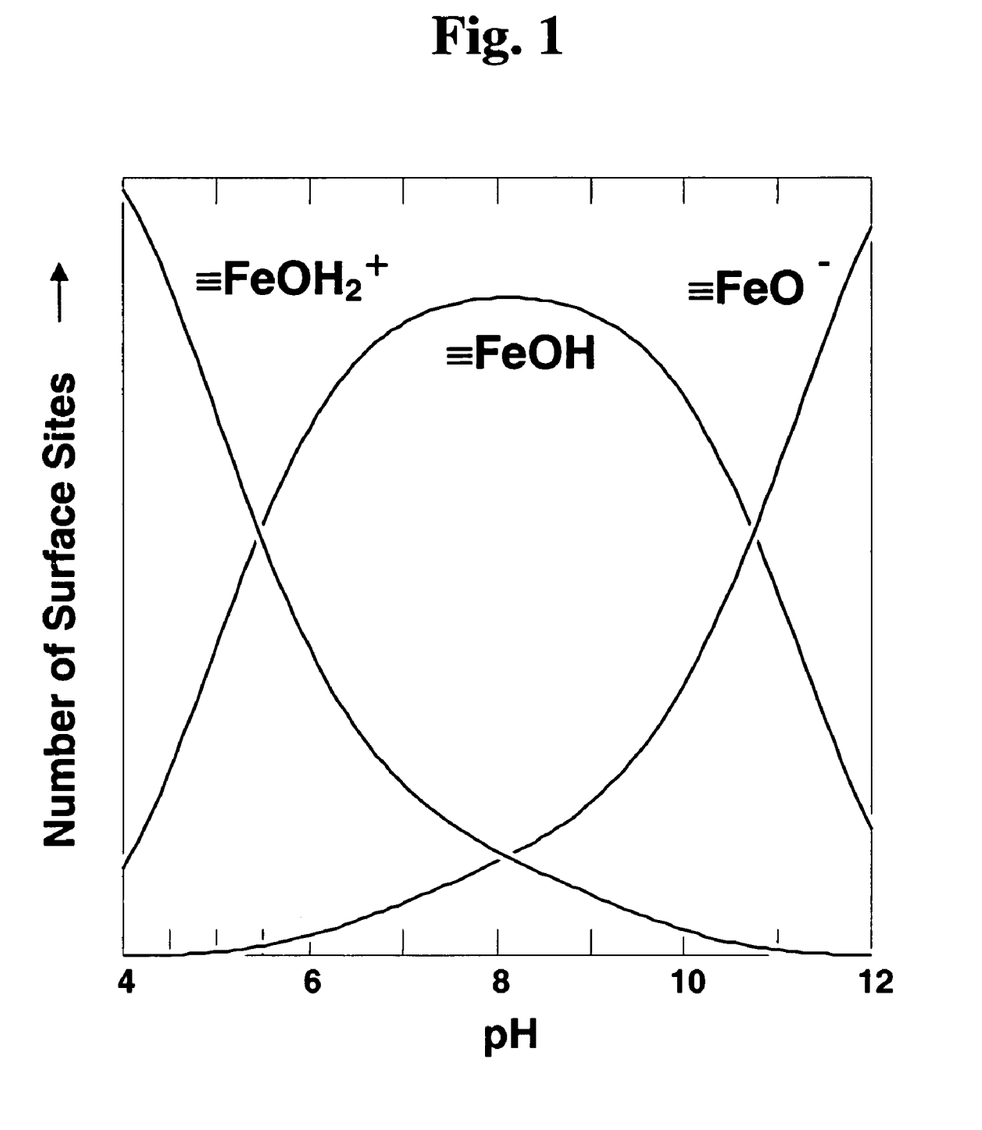
FIG. 1 illustrates the form of iron (y-axis "Number of Surface Sites") in surface structures that contain ferric oxide minerals, depicted as a function of acidity (x-axis "pH"). The sorption of metal ions (preferably cationic) increases as the pH increases, because the sorption of metal cations onto the iron (III) surface liberates hydrogen ions ($H^+$). As such, an increase in pH serves to favor the sorption of metal cations, and to cause metal cations to sorb more tightly. Acidic environmental factors, conversely, inhibit the sorption capacity of the water-bearing natural structures containing ferric minerals.

Mineral compounds. Contemplated mineral compounds that provide metal contaminant sorbing sites include but are not limited to metal oxides, hydroxides, and oxyhydroxides with surface sites that convert between the protonated hydroxy, hydroxy and oxy forms. FIG. 1 shows these forms for ferric oxide, including the number of metal contaminant sorption sites as a function of surface acidity. Preferred mineral compound examples are composed of the metals ferric iron, manganese, silicon, and aluminum. It is to be understood that the surface sites of these mineral compounds exist in equilibrium, depending their respective pH profile and other environmental factors, in oxide form and hydrous oxide (oxy-hydroxide) form.

Metal contaminants. When metal contaminants are immobilized, they are thus taken out of the groundwater moving through a groundwater-bearing formation. The metal contaminants of concern are dissolved or dispersed in the groundwater, and are referred to herein as mobile metal contaminants. Metal contaminants in groundwater that are of primary concern include heavy metals, such as lead and mercury. Copper and zinc also rise to contaminating levels in certain groundwaters. Further significant divalent metal ions that commonly require remediation are $Ni^{2+}$ and $Co^{2+}$ (the latter may be radioactive). For the purposes of the present invention, contemplated metal contaminants are those whose levels are above the desired concentration in groundwater. The metal contaminants that tend to be sorbed by the contemplated mineral compounds are commonly cations.

Sorbing sites. For example, a metal oxide surface sorbing site, represented in the equations below as ≡MOH, showing the metal in the mineral compound, M, bonded to the bulk mineral by three (representing multiple) bonds to oxides to the extended mineral structure, and having an —OH at the sorbing site. The mineral compound sorbs a metal contaminant as shown in the exemplary equations below.

$$Pb^{2+} + \equiv MOH \rightarrow \equiv MOPb^+ + H^+$$

$$Hg^{2+} + \equiv MOH \rightarrow \equiv MOHg^+ + H^+$$

$$Cu^{2+} + \equiv MOH \rightarrow \equiv MOCu^+ + H^+$$

$$Zn^{2+} + \equiv MOH \rightarrow \equiv MOZn^+ + H^+$$

In the typical mineral compounds that provide sorbing sites, ferric oxides, manganese (III) oxide, silica and alumina, the M in the above equations represents iron, manganese, silicon and aluminum, respectively.

Aqueous alkaline solution. A contemplated aqueous alkaline solution is a high pH solution, pH 8 or greater, capable of raising the local pH at the surface of the mineral compounds within the groundwater-bearing formation. Preferably, such a solution is an aqueous solution of a strong base or a mixture of strong bases. Preferred basic anions include but are not limited to hydroxide, carbonate, phosphate, phosphite, silicate, with hydroxide, carbonate or silicate being particularly preferred.

Figure 2:
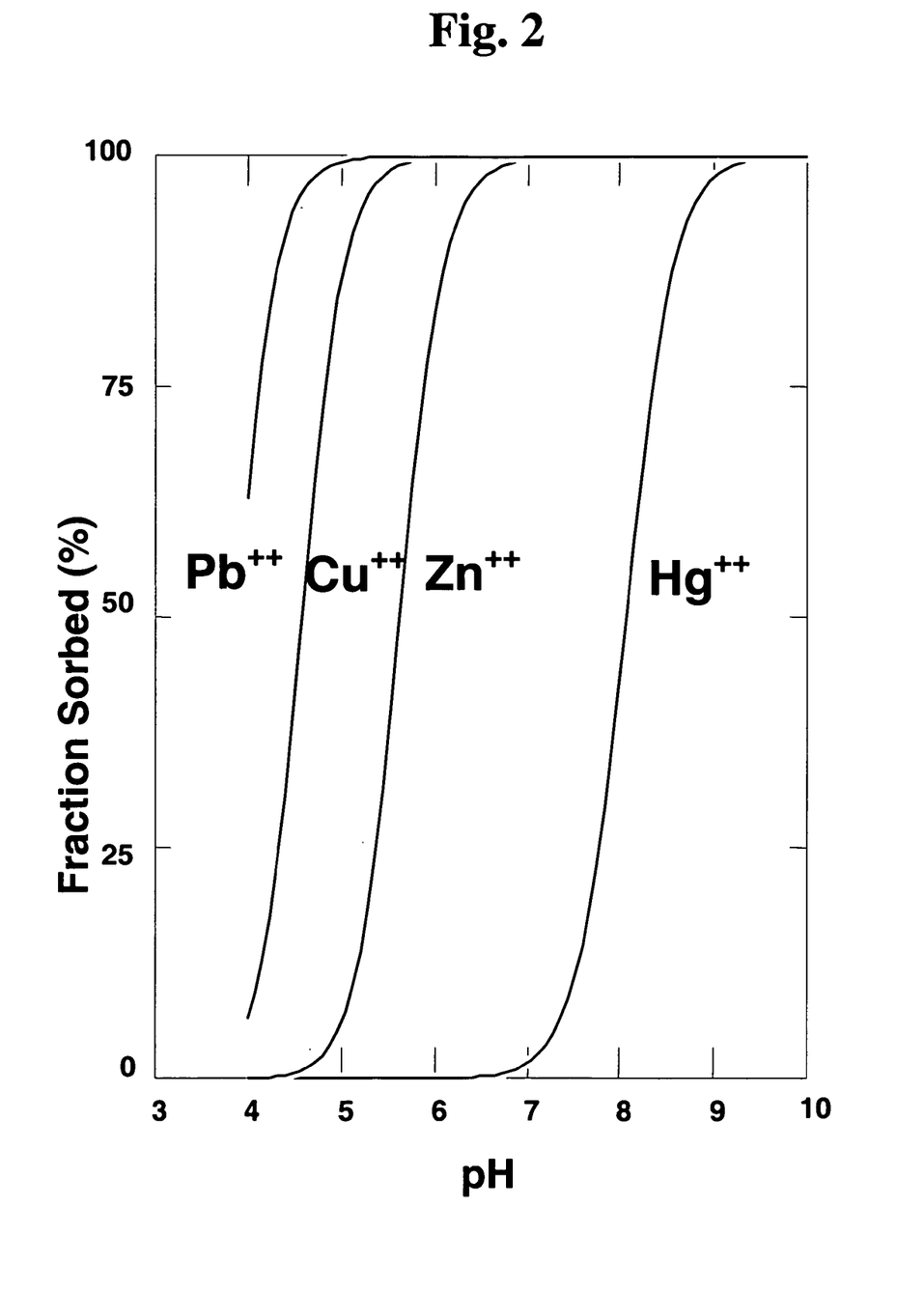
FIG. 2 illustrates sorption profiles for the metal ions lead ($Pb^{++}$), copper ($Cu^{++}$), zinc ($Zn^{++}$), and mercury ($Hg^{++}$). The graph shows the fraction of the metal sorbed as a function of pH. Under non-saturating metal contaminant conditions, when the pH is about 6.5, the ferric mineral is able to sorb essentially all of the lead (II), copper (II) and zinc (II), while the mercury is not sorbed. Providing conditions such that the pH is about 9 ensures sorption of essentially all of the mercury (II) as well as the other metal ions.

Two factors must be considered in determining the concentration of base to be included in the alkaline solution. First, the pH of the aqueous alkaline solution needs to be high enough to permit, once the solution mixes with the ambient groundwater flow, the sorbing mineral compounds in the groundwater-bearing formation to sorb the metal contaminants. Please refer, for example, to the pH profile for iron oxide in FIG. 2. Second, the alkaline flood should be designed so that as much of the alkalinity as possible will be used for neutralizing surface acidity. For this second factor, it is important to avoid mineral precipitation of the base, which could then consume the majority of the aqueous alkaline solution's alkalinity (and thus, neutralizing power). The latter criterion can also bear upon the selection of the cationic composition of the aqueous alkaline solution to be used for the alkaline flood. For example, a calcium solution should not be used in a groundwater-bearing formation where precipitation of carbonate minerals (e.g $CaCO_3$) is possible.

Preferably, upon introduction of the aqueous alkaline solution and mixing with the ambient groundwater flow, the pH of the mixture is not higher than about 12, in order to prevent precipitation of the pH-controlling base from the solution or the dissolution of the sorbent mineral compounds. For example, alumina will dissolve at very high pH, such as above pH 12. Examples of a contemplated strong base include, but are not limited to a metal hydroxide, metal carbonate, or metal silicate; where the metal is a highly prevalent low-valence metal ion, such as sodium or potassium, although divalent cations magnesium or calcium are also useful, and preferably the metal ion is abundant in naturally occurring uncontaminated groundwater; and where the anion (basic) moiety is a naturally-occurring mineral anion.

The concentration of the pH-controlling base in the aqueous alkaline solution should be sufficiently high that the alkalinity is not consumed by reactions within the water-bearing formation immediately. Preferably, the concentration before mixing with ambient groundwater is at least 0.1 N base, more preferably 1 to 5 N.

The cationic composition of the aqueous alkaline solution may be any cation, preferably inorganic in nature. The cationic composition of the aqueous alkaline solution is not a metal ion whose removal would be desired, but preferably is a standard cation such as an alkali metal or alkaline earth metal from group IA or group IIA of the periodic table, preferably rows 2 through 4, (e.g. $K^+$, $Na^+$, $Ca^{++}$, $Mg^{++}$), or a typical inorganic cation such as ammonium ion ($NH_4^+$), among others. Particularly preferred examples are alkali metal ions such as $K^+$, $Na^+$, $Ca^{++}$, and $Mg^{++}$. Also particularly preferred is the ammonium ion, $NH_4^+$, which also serves as a nitrogen source for some bacteria that can also enhance water-purifying properties of aquifers. The type of mineral(s) in the water-bearing formation affects the preference of aqueous alkaline solution, as discussed in more detail below.

The anionic composition of the aqueous alkaline solution is a strong base, preferably an inorganic base. Such bases include but are not limited to hydroxide ion, silicate ion, aluminate, phosphate, and carbonate.

In an embodiment of the preferred process, the aqueous alkaline solution comprises one or more of NaOH, $Na_2CO_3$, or $Na_2SiO_3$.

The nature of the mineral makeup of the water-bearing formation should be considered when selecting a base and counter-ion for preparing the aqueous alkaline solution. For example, if a water-bearing formation is contains a high concentration of calcium-laden minerals, the use of carbonate ions in the aqueous alkaline solution will cause the precipitation of calcium carbonate within the water-bearing formation, consuming alkalinity and possibly impeding the flow of groundwater. As another example, if a water-bearing formation contains a high concentration of alumina-based minerals, such as kaolinite, the mineral compounds will react with a KOH solution to make an undesired potassium clay.

In order to evaluate the risk of mineral precipitation, calculations (on the basis of mineral solubility) and/or experiments are preferably used. The type of experiment commonly used for evaluating the risk of mineral precipitation is a column experiment where a large tube is filled with sediment from the subject groundwater-bearing formation, solution is slowly pumped through the column, and the chemistry of the effluent is observed and analyzed.

Application of the alkaline solution. The alkaline solution can be introduced into the groundwater-bearing formation by a suitable means. For example, it may be introduced by injection wells. In order to encourage flow into the groundwater-bearing formation, it may be helpful to remove groundwater at another location at the same time, for example by pumping downstream.

For example, injection systems as defined by any suitable arrangement of wells for the particular application (groundwater treatment, well-head protection or backstop) may be used. The injection wells can be arranged in any convenient pattern, for example a conventional five spot pattern wherein a central well is surrounded by four somewhat symmetrically located injection wells. Alternatively, other suitable patterns include inter alia, line drive, staggered line drive, four spot, and seven spot.

The term "pore volume" is generally understood in the geologic arts. ASTM International D44404-84(1998)e1 describes a standard test method for determination of pore volume and pore volume distribution of soil and rock by mercury intrusion porosimetry. Pore volume is used herein as it may apply to a groundwater-bearing formation as the volume of water required to replace or flush out the water in a certain volume of the formation. Although there may be substantial heterogeneity in a groundwater-bearing formation, the amount applied need not be precise to successfully carry out the present invention.

Furthermore, as the aqueous alkaline solution passes through an acidic groundwater-bearing formation, basic equivalents are lost at the front as neutralization occurs, so the alkaline front lags farther and farther behind the spreading front of introduced solution as it progresses. As a result, the concept of pore volumes introduced does not directly reflect the number of pore volumes of alkaline solution actually in the groundwater-bearing formation at any given time, depth or area. As a result, the "pore volumes" referred to herein are used in a very general manner. In a preferred embodiment, at least a few pore volumes of aqueous alkaline solution are applied to the portion of the groundwater-bearing formation to be treated.

The aqueous alkaline solution equilibrates rapidly with the sorption surface in comparison to the time that it typically takes for water to migrate through the subsurface of a groundwater-bearing formation. Acid-base reactions tend to be very rapid (e.g. diffusion-limited). Typically, the sorbing sites equilibrate right away with the pH of the aqueous alkaline solution.

However, due in part to the volume of a groundwater-bearing formation and the rate of flow, a typical process carried out according to the present invention uses a large volume of aqueous alkaline solution (for example, 50 to 100,000 gallons) applied over a long period of time (for example, several hours to several months). A worker of ordinary skill in the field is immediately able to appreciate the range of variation in both volume and time that will be helpful for various applications, depending on the particular groundwater-bearing formation to be treated. The rough pore-volume suggestions provide sufficient guidance to a worker of ordinary skill, who is also easily familiar with flow rates acceptable through the various groundwater-bearing formations and thus the application time needed to introduce the desired volume.

Treated mineral compound. Exposure of a mineral compound present in a groundwater-bearing formation to an aqueous alkaline solution returns the sorbing sites therein to a basic form that has a higher affinity for sorbing metal contaminants than the mineral compound sorbing sites at low pH. See, for example, FIG. 2. In a contemplated process, the metal contaminant sorption capacity is enhanced or regained through application of the alkaline solution to the groundwater-bearing formation. After treatment, the mineral compound is referred to herein as the "treated mineral compound".

Attenuated metal content. The goal of the present invention is to reduce the level of contaminants in groundwater that passes through a groundwater-bearing formation. Relative to the initial metal content of groundwater from an untreated groundwater-bearing formation, the methods of the present invention result in a lower concentration of contaminants in the groundwater collected from the treated groundwater-bearing formation. This is referred to as attenuated metal content.

An alternative usage in the art refers to metal attenuation through passing contaminated groundwater through a groundwater-bearing land formation that contains adsorbent clay and/or other minerals. This is the natural process of contaminant attenuation by the earth. For the natural process, the attenuation of metal content refers to the metal concentration before and after the water passes through the ground. For a process of the invention, the attenuation refers to the metal concentration in groundwater passing through the ground after treatment according to the present invention relative to without (or before) treatment. As it applies to the natural process, the invention has been termed "accelerated attenuation" of metal content, because treatment according to the invention permits the groundwater-bearing formation to more effectively reduce the metal content of the groundwater passing through the formation.

Desorbing and leaching. When metal contaminants that were already adsorbed to mineral compounds within a groundwater-bearing formation release those metal contaminants into the groundwater, that is termed "desorption". At a higher pH, the binding constant (adsorption affinity) is higher for metal cations. Acid contamination of the groundwater causes the pH, and thus the adsorption affinity, to drop, so metal contaminants desorb. Leaching refers to metal contaminants moving into the groundwater from within the minerals of the groundwater-bearing formation.

Dissolved metal species. In some embodiments the groundwater contains other metal species that are capable of precipitating and providing additional sorbing sites. In preferred embodiments, the metal species is iron (III), aluminum (III) or silicon (IV) that can precipitate to form iron oxide, alumina or silica that have the preferred sorbing sites. In addition, iron (II) and manganese (II) can oxidize to (III) in the presence of high pH fluids, and then precipitate as additional sorbing mineral.

Applications of the process. The processes of the invention are useful for treating groundwater-bearing formations in situ. Due to the pH-altering nature of the treatment, its application is most useful in formations that have been exposed to acidic conditions that have altered the contaminant-sequestering nature of the formation.

Processes according to the invention are also useful as a local treatment to attenuate metal concentrations, for example to decrease contaminants in groundwater that departs from a contamination source or that approaches a water source to be protected.

The following examples of the invention are provided to explain in detail applications of selected embodiments of the invention, and are not intended to be limiting.

EXAMPLE 1

Remediation of Acid Contamination

An aquifer is contaminated by metal-rich acid drainage from a mining operation. The mine is situated upgradient of a groundwater-bearing formation that has a slow but general flow direction downgradient. The acid contamination of the groundwater-bearing formation decreases the metal sorption capacity of the mineral compounds within the groundwater-bearing formation. The sporadic, ongoing release of acid contamination results in several plumes of heavy metal contamination that extend up to 1000 yards downgradient of the mining operation.

The groundwater-bearing formation contains significant portion of kaolinite mineral compounds (alumina-based), but little calcium.

Drainage from the mining operation is modified so that metal-contaminated water no longer enters the aquifer.

An extraction well is drilled about 1000 yards downgradient of the mining operation to assist in flushing water through the contaminated portion of the aquifer, and to serve as a monitoring well. The extraction well initially produces groundwater samples that have a high metal content.

An injection well is drilled at the mining operation, near the original source of contaminated water. For an initial period, 3,000 gallons per day of clean water is injected in this well, and an equivalent amount produced from the extraction well. Water drawn from the extraction well is treated to remove metal contaminants and neutralize acidity, and reinjected at the injection well.

After a period of three months, the injected water has displaced the original contaminated water from the highly conductive portion of the aquifer. At this point, the metal concentration observed at the extraction well drops sharply, although it remains in excess of environmental standards and continues to require treatment.

At this point, 200 gallons per day of a 1 N solution of sodium carbonate is injected into the ground below the surface into each well of a linear array of five wells penetrating the aquifer, evenly spaced along the contaminant plume, from the mining operation to 500 yards upgradient of the extraction well.

After six months of injection of the alkaline solution, the metal concentration in water produced from the extraction well is observed to fall within environmental standards, and pH is observed to have risen to above 8. At this point, injection of the alkaline solution and pumping of the extraction well cease. Water samples are drawn from the extraction well weekly for a period of three years and monitored to assure that metal concentration there meets or exceeds environmental standards.

EXAMPLE 2

Backstop for Source Control

A mine operator carries out several processes for recovery of precious metals from ore-laden earth using acidic solutions. Some of the acidic solutions percolate into an aquifer, creating a plume of metal contamination gradually migrating downgradient. The mine operators terminate the recovery processes and carry out treatments, such as sulfide precipitation of the acid washes, to remove dangerous heavy metals from the contaminated groundwater. The treatments are largely but not completely effective and contaminant metals continue to migrate downgradient through the aquifer in small but significant concentrations. There is furthermore concern that some of the previously immobilized metals will be remobilized at a future date.

The invention is applied as a source control to minimize continued movement of contaminants along the aquifer. A 2N aqueous solution of sodium hydroxide is pumped into the ground in a linear arrays of ten injection wells that spans an interval of the aquifer downgradient of the contaminant plume. The wells are built about 50 yards downgradient from the current position of the toe of the plume, spaced 20 yards apart, and positioned to intercept the plume as it advances.

Aqueous alkaline solution is pumped into the injection sites until the high-pH front breaks through to an observation well 100 yards downgradient from the injection wells. The mineral compounds of the groundwater-bearing formation between the injection sites and the observation well are thus treated according the invention. The result is an effective sorption zone in situ protecting the aquifer downgradient of the mining operation from the contamination source.

Monitoring of the metal content in groundwater downgradient of the treatment zone shows that the contaminant metals are present at concentrations that meet or exceed environmental standards.

EXAMPLE 3

Backstop for Permeable Reactive Barriers

A chemical waste site provides a metal contamination source. Industrial waste buried in containers underground is subject to leaking as the old, buried containers deteriorate. The waste site overlies an aquifer through which water is migrating in a certain direction. The metal contamination enters the aquifer and forms a plume that migrates downgradient. A reactive barrier is set up that approximately spans the width of the metal contamination plume (as determined from sample testing) and is located downgradient of the metal contamination source. The permeable reactive barrier serves as a first protective stage that prevents contamination from migrating off the site.

To enhance the effectiveness of the cleansing properties of the groundwater-bearing formation, injection points are instituted in a linear pattern downgradient of the chemical waste site and reactive barrier. A volume of A 5N solution of sodium hydroxide is pumped into the injection points that is sufficient to displace several times the pore volume for about 100 yards surrounding the waste site about 50 feet in depth, or a volume of 15,000 square feet per linear foot around the injected perimeter of the site.

The treated mineral compounds are thus formed for about 100 yards of the region downgradient of the site. The groundwater further downstream is not removed to make space for the aqueous alkaline solution that had been applied. Rather, the solution is permitted to diffuse further into the groundwater-bearing formation to create an expanded treated zone, although the concentration of alkali is lessened due to the previous passage through the formation. The treated zone serves to immobilize metal ions that pass through or bypass the reactive barrier.

Groundwater monitoring is carried out in various locations near the chemical waste site.

EXAMPLE 4

Well-Head Protection

A well is situated in a groundwater-bearing formation. As a result of the pumping from the well, the groundwater flows from the groundwater-bearing formation generally toward the well. In a circular pattern surrounding the well, about 30 yards from the well site, a 2N aqueous solution of sodium carbonate is injected into the groundwater-bearing formation. The well is pumped to draw the alkaline solution through the groundwater-bearing formation until a sharp rise in pH is noted. Reaction of the alkaline solution with the mineral compounds creates a 30-yard wide swath of groundwater-bearing formation surrounding the well-head that contains treated mineral compounds. The well-head is thereby protected from contamination by metal ions.

From the foregoing, it will be observed that numerous modifications and variations can be effected without departing from the true spirit and scope of the present invention. It is to be understood that no limitation with respect to the specific examples presented is intended or should be inferred. The disclosure is intended to cover by the appended claims modifications as fall within the scope of the claims.

The invention claimed is:

1. A process for enhancing the sorption capacity of a groundwater-bearing formation comprising the steps of:
   a. providing a groundwater-bearing formation comprising groundwater and a mineral compound, wherein said mineral compound has a mineral surface comprising sorbing sites having an initial metal contaminant sorption capacity and said mineral compound comprises one or more of ferric oxide, manganese oxide, alumina, silica or their respective hydrous, anhydrous hydroxy, or oxyhydroxy forms, wherein said groundwater may contain mobile metal contaminants;
   b. applying an aqueous alkaline solution to the groundwater-bearing formation, wherein said application of said aqueous alkaline solution inhibits desorption of metals from the mineral surface to form a new mobile metal contaminant; and
   c. contacting said mineral compound with said aqueous alkaline solution to convert the mineral compound to a form having a higher metal contaminant sorption capacity than the initial metal contaminant sorption capacity thereby forming a treated mineral compound within said groundwater-bearing formation.

2. The process according to claim 1 wherein the application step is accomplished through injection of the aqueous alkaline solution into the groundwater-bearing formation.

3. The process according to claim 1 wherein said aqueous alkaline solution comprises one or more of NaOH, $Na_2CO_3$, or $Na_2SiO_3$.

4. The process according to claim 1, wherein said groundwater may further contain dissolved metal species, said process comprising a further step of:

d. contacting the groundwater with the aqueous alkaline solution to precipitate the dissolved metal species to form precipitated metal species, wherein the precipitated metal species provides additional metal ion contaminant sorbing sites.

5. The process according to claim 4 wherein said dissolved metal species is selected from the group consisting of iron (III), iron (II), manganese (III), manganese (II), aluminum (III) and silicon (IV).

6. A process for the remediation of groundwater contaminated by metal ions through attenuation of the metal content therein, wherein said groundwater is in a groundwater-bearing formation, comprising the steps of:
  a. providing a groundwater-bearing formation, wherein said groundwater-bearing formation comprises groundwater and a mineral compound, and wherein said mineral compound has a mineral surface comprising sorbing sites having an initial metal contaminant sorption capacity, and wherein said groundwater may contain mobile metal contaminants;
  b. applying an aqueous alkaline solution to the groundwater-bearing formation in a manner that permeates the zones of the aquifer through which water flows;
  c. contacting said mineral compound with said aqueous alkaline solution to convert the mineral compound to a form having a higher metal contaminant sorption capacity than the initial metal contaminant sorption capacity to form a treated mineral compound within said groundwater-bearing formation; and
  d. contacting said treated mineral compound with groundwater that may contain mobile metal contaminants to permit the treated mineral compound to sorb mobile metal contaminants to form groundwater having an attenuated metal content.

7. The process according to claim 6 wherein the application step is accomplished through injection of the aqueous alkaline solution into the groundwater-bearing formation.

8. The process according to claim 6 wherein said aqueous alkaline solution comprises one or more of NaOH, $Na_2CO_3$, or $Na_2SiO_3$.

9. The process according to claim 6 wherein said mineral compound comprises one or more of ferric oxide, manganese oxide, alumina, silica or their respective hydrous, anhydrous hydroxy, or oxyhydroxy forms.

10. A process for the protection of well-head from metal contaminants, wherein said well-head is in a groundwater-bearing formation, comprising the steps of:
  a. providing a well-head in a groundwater-bearing formation, wherein said groundwater-bearing formation comprises groundwater and a mineral compound, and wherein said mineral compound has a mineral surface comprising sorbing sites having an initial metal contaminant sorption capacity, and wherein said groundwater may contain mobile metal contaminants;
  b. applying an aqueous alkaline solution to the groundwater-bearing formation in a manner such that at least some of the groundwater reaching the well-head has had to pass through the portion of the groundwater-bearing formation that has the treated mineral compound formed in step c;
  c. contacting said mineral compound with said aqueous alkaline solution to convert the mineral compound to a form having a higher metal contaminant sorption capacity than the initial metal contaminant sorption capacity to form a treated mineral compound within said groundwater-bearing formation;
  d. contacting said treated mineral compound with groundwater that may contain mobile metal contaminants to permit the treated mineral compound to sorb mobile metal contaminants to form groundwater having an attenuated metal content thereby protecting the well-head from metal contaminants.

11. The process according to claim 10 wherein the application step is accomplished through injection of the aqueous alkaline solution into the groundwater-bearing formation.

12. The process according to claim 10 wherein said aqueous alkaline solution comprises one or more of NaOH, $Na_2CO_3$, or $Na_2SiO_3$.

13. The process according to claim 10 wherein said mineral compound comprises one or more of ferric oxide, manganese oxide, alumina, silica or their respective hydrous, anhydrous hydroxy, or oxyhydroxy forms.

14. A process for providing a backstop to a permeable reactive barrier water treatment method or a water source control method to further remove metal contaminants, wherein groundwater in a groundwater-bearing formation has been previously treated by a permeable reactive barrier water treatment method or a water source control method, said backstop comprising the steps of:
  a. providing a groundwater-bearing formation, wherein said groundwater-bearing formation comprises a mineral compound and groundwater that has been previously treated by a permeable reactive barrier water treatment method or a water source control method, and wherein said mineral compound has a mineral surface comprising sorbing sites having an initial metal contaminant sorption capacity, and wherein said groundwater may contain mobile metal contaminants;
  b. applying an aqueous alkaline solution to the groundwater-bearing formation in a manner that at least some of the groundwater reaching the portion of the groundwater-bearing formation that has the treated mineral compound formed in step c has been previously treated by a permeable reactive barrier water treatment method or a water source control method;
  c. contacting said mineral compound with said aqueous alkaline solution to convert the mineral compound to a form having a higher metal contaminant sorption capacity than the initial metal contaminant sorption capacity to form a treated mineral compound within said groundwater-bearing formation;
  d. contacting said treated mineral compound with groundwater that may contain mobile metal contaminants to permit the treated mineral compound to sorb mobile metal contaminants to form groundwater having an attenuated metal content thereby providing a backstop to a permeable reactive barrier water treatment method or a water source control method to further remove metal contaminants.

15. The process according to claim 14 wherein the application step is accomplished through injection of the aqueous alkaline solution into the groundwater-bearing formation.

16. The process according to claim 14 wherein said aqueous alkaline solution comprises one or more of NaOH, $Na_2CO_3$, or $Na_2SiO_3$.

17. The process according to claim 14 wherein said mineral compound comprises one or more of ferric oxide, manganese oxide, alumina, silica or their respective hydrous, anhydrous hydroxy, or oxyhydroxy forms.

18. The process according to claim 1 wherein said aqueous alkaline solution has a pH of 8 or greater.

19. The process according to claim 6 wherein said aqueous alkaline solution has a pH of 8 or greater.

20. The process according to claim 10 wherein said aqueous alkaline solution has a pH of 8 or greater.

21. The process according to claim 14 wherein said aqueous alkaline solution has a pH of 8 or greater.

* * * * *